(12) United States Patent
Hanna (10) Patent No.: US 9,658,872 B1
(45) Date of Patent: May 23, 2017

(54) MAINTAINING USER IDENTITY ASSOCIATED WITH ACCESS TO NETWORK RESOURCES USING VIRTUAL MACHINES

(75) Inventor: Stephen R. Hanna, Brighton, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 796 days.

(21) Appl. No.: 13/463,489

(22) Filed: May 3, 2012

(51) Int. Cl.
*G06F 9/455* (2006.01)
*G06F 9/46* (2006.01)
*G06F 9/50* (2006.01)

(52) U.S. Cl.
CPC .......... *G06F 9/45558* (2013.01); *G06F 9/455* (2013.01); *G06F 9/50* (2013.01)

(58) Field of Classification Search
None
See application file for complete search history.

(56) References Cited

U.S. PATENT DOCUMENTS

| 8,589,385 | B2* | 11/2013 | Taylor et al. | 707/722 |
| 8,813,197 | B2* | 8/2014 | Sabin | 726/3 |
| 2002/0120597 | A1* | 8/2002 | Bae | 707/1 |
| 2010/0146123 | A1* | 6/2010 | Park et al. | 709/226 |
| 2011/0184993 | A1* | 7/2011 | Chawla et al. | 707/802 |
| 2013/0111468 | A1* | 5/2013 | Davis et al. | 718/1 |
| 2013/0152077 | A1* | 6/2013 | Leitman et al. | 718/1 |
| 2013/0275975 | A1* | 10/2013 | Masuda et al. | 718/1 |

* cited by examiner

*Primary Examiner* — Meng An
*Assistant Examiner* — Bradley Teets
(74) *Attorney, Agent, or Firm* — Shumaker & Sieffert, P.A.

(57) ABSTRACT

The identity of a user of a computerized system is maintained by operating a virtual machine used only by the user, such that logged actions made by the virtual machine can be associated with the user, wherein the user is not otherwise directly identified by the virtual machine. Information requests made from the virtual machine to a specific resource may be logged to enable tracking and auditing of resource access by the user. The virtual machine is managed by an access device to a data center for the enterprise system, a server, or other device within the data center.

20 Claims, 5 Drawing Sheets

MAINTAINING USER IDENTITY ASSOCIATED WITH ACCESS TO NETWORK RESOURCES USING VIRTUAL MACHINES

FIELD

The invention relates generally to computer networks, and more specifically to application software provided by computer networks to network users.

BACKGROUND

Computer networks have become commonplace and taken many forms, from cellular data networks for smart phones to localized networks such as a Wi-Fi network and the familiar Ethernet connections commonly used to provide hard-wired connection to the Internet. Networks such as these enable users to share resources and data, such as to surf the World Wide Web for information, to send email, or to view a streaming movie.

Information is communicated over the Internet using packet switching technology, in which information is broken up into packets of data that are routed from a source to a destination, based on an Internet Protocol (IP) address. Routers and other machines in the network use a routing protocol to ensure that data makes it from the source machine to the intended destination, which is then able to reassemble the packets to form the original information sent, such as an email, a movie, or a web page.

For example, a user wishing to conduct online banking may open a browser window, such as Internet Explorer or another suitable browser, and enter a Uniform Resource Locator (URL) for the bank's website. The web page request is sent to the bank's servers via the Internet, and web page data for the bank's home page is provided in response. The user can then log in to the website, establishing a secure or encrypted connection between the user and the bank's servers so that confidential banking can be conducted without routers or other machines between the bank and the user being able to read the packets of data exchanged.

But, it is unlikely that the bank's server is a single computer system located at the bank, due to the varying and sizable demands of serving many customers and providing many services at one time. Most businesses therefore rely on a data center that specializes in providing networked data services to host their websites and other data systems, enabling the data center to better serve clients by providing varying resources to meet changing user demands.

This is achieved in many instances by using virtual servers, which in many examples are multiple instances of server software running on the same computer system or what appears to be a single instance of a server distributed across many computer systems. Small customers or services can therefore be combined and run using different virtual servers on the same computer, while large services such as popular web pages can be distributed across many different computer systems.

Network services often are implemented as several layers of application software, such as a web page front end that provides an interface to a user, business logic that handles information exchange between the web interface provided to the user and a database, and databases or other repositories of information. In this implementation, a single information request from a user may trigger multiple requests between the different layers of application software. The identity of the user initiating the request is often lost during this process. The loss of identification of the requesting user makes it difficult to track or audit database access.

SUMMARY

In one example, the identity of a user of a computerized system, such as an enterprise system, is maintained by dynamically instantiating and operating a virtual machine on a per-user basis, i.e., by allocating a virtual machine used only by the respective user. In this way, any actions made by the virtual machine to access resources of the enterprise system are associated with the user, wherein the user is not otherwise directly known to the virtual machine. For example, any information requests made from the virtual machine to a specific database may be logged to enable tracking and auditing of database access by the user. In some examples, the techniques of this disclosure may be performed by an access device to a data center for the enterprise system, such as a web server or firewall. In other examples, the techniques of this disclosure may be performed by a server or other device within the data center itself.

In a further example, user identity is maintained in a computerized system by receiving a request for a network resource via a first computer system from an identified user, and instantiating one or more virtual machines associated with the identified user that are used only by the identified user. The request for the network resource is processed in the one or more virtual machines associated with the identified user, processing the request not including processing an identity of the user. A record of the request for the network resource is stored in a log associated with the identified user, comprising requests processed by the one or more virtual machines used only by the identified user. The log of requests made to the virtual machines is associated with the identified user based on the one or more virtual machines being used only by the identified user.

In another example, a computerized system comprises a first computer system operable to send a request for a network resource to one or more virtual machines associated with an identified user that are used only by the identified user, the first computer system comprising a processor and memory. One or more virtual machines are associated with the identified user, operable to receive and process the request for a network resource, processing the request not including processing an identity of the user. The computerized system is further operable to store a record of the request for a network resource in a log comprising requests made to the one or more virtual machines, and associate the log of request made to the one or more virtual machines with the identified user based on the one or more virtual machines being used only by the identified user.

In another example, a machine-readable medium with instruction stored thereon includes instructions that when executed are operable to cause a computerized system to receive a request for a network resource via a first computer system from an identified user. The instructions when executed are further operable to cause the computerized system to send the request for a network resource from the first computer system to one or more virtual machines associated with the identified user that are used only by the identified user, and receive and process the request for a network resource in the one or more virtual machines associated with the identified user, processing the request not including processing an identity of the user. Instructions when executed are further operable to cause the computerized system to store a record of the request for a network resource in a log comprising requests made to the one or more virtual machines, and associate the log of request made to the one or more virtual machines with the identified user based on the one or more virtual machines being used only by the identified user.

In another example, a method comprises maintaining the identity of a user of a computerized system by operating a virtual machine used only by the user, such that logged actions made by the virtual machine can be associated with the user, wherein the user is not otherwise directly identified to the virtual machine.

The details of one or more examples of the invention are set forth in the accompanying drawings and the description below. Other features, objects, and advantages of the invention will be apparent from the description and drawings, and from the claims.

DETAILED DESCRIPTION

Data centers and other network resource providers often have complex server architectures, involving multiple layers such as a user interface, a database, and business logic or code that provides a bridge between the user interface and stored data. A single request from a user may involve accessing and logging on to a website server using a web browser, filling in and submitting a form, forming and sending a database query based on the form information to a database, receiving the data in the website server, and rendering the requested data to the user as a new web page.

Even in this simplified example, the user's identity is established by the web server during login, but may not be retained in the interactions between the web server, business logic, and the database or other computers in the data system architecture. In more complex examples, a single request from a user may trigger many requests from one piece of application software to one or more other resources, often not including the user's identity in the request process. Many such requests are made between systems by a single anonymous "system user", resulting in an inability to track or audit which users have accessed which data. This can be of particular concern when data is sensitive, or may be subject to abuse such as by aggregation of large amounts of data for unauthorized purposes.

For example, patient records in a hospital setting are desirably easily accessible by any number of doctors, nurses, and other staff who may need prompt access to such information to ensure proper and timely medical care can be provided. But, granting widespread access to confidential data on a large number of patients to so many people has resulted in some users abusing their access, looking up medical records for acquaintances or celebrities who are not presently being treated by the system user. Regulations like HIPAA (Health Insurance Portability and Accountability Act) may also restrict use and disclosure of medical information deemed private health information, and impose other requirements such as tracking disclosure of such information and disclosing the minimum amount of information needed to achieve a particular purpose.

Similar concerns arise in other industries, such as banking, in which a teller will desirably have access to all account information for customers of a large bank, but accessing financial information for celebrities, neighbors, or other people where no business need to access the information exists is not desirable.

Tracking user access to data may provide other benefits beyond private information of individuals, such as observing access patterns of an individual to determine whether the user's data access is consistent with their responsibilities, or what data is of value to what people or projects.

In one example, a single user of military computer systems may potentially download a very large number of documents from secure systems, including hundreds of thousands of confidential messages, videos, and other sensitive military information, and leak the information to a website for public distribution. If a tracking or auditing system enabled tracking the volume, type, or variety of material downloaded by the user, the pattern of downloads could be been identified so that action to contain the sensitive data may be taken before the material is released.

In addition to recognizing patterns of data access outside the scope of one's responsibilities to identify potential misuse of data, tracking or auditing data access can help identify sensitive data or indicate projects or users that might be impacted by a change in data. Consider as an example a beverage manufacturer having databases with information on customer demand for different kinds of soda across various regions over many years. They also have access to economic and demographic information for the various regions, such as from census data. Geographic Information Systems (GIS) can relate data to geography and calculate transit costs for various routes to various regions. Other databases provide information on raw ingredient prices, processing costs, and labor costs at various plants.

Analysts are employed by the beverage manufacturer to use these databases to predict customer demand and decide which beverages will be needed where, what prices should be set, where raw ingredients should be purchased, what plants should produce what products, and other such decisions. Some of the data in the databases is therefore sensitive from a competitive standpoint, while other information such as regional economic data is publicly available. A manufacturer may therefore want to know who accessed what information, and what project or task the analyst was working on when accessing the data. A rogue analyst may pull down unusually large amounts of data, or data not previously associated with a particular task or project, making data access tracking useful as a tool for identification of a user that may misuse data.

By tagging requests with a user name and including the identity of a project or task the user is working on, the manager can identify the projects or tasks that may be impacted by changes in data, such as a decline in sugar prices or a rise in transportation costs. Decisions or projects making use of changed data can therefore be identified and reevaluated, ensuring that the impact of data on various projects or analysts is identified and can be communicated to appropriate personnel.

But, anonymization of communication between various computer systems, such as one system identifying itself to one or more other systems by a single anonymous "system user", results in an inability to track or audit which users have accessed which data. Some examples of the invention therefore provide a system of virtual machines associated with different users, projects, or other trackable user identification, ensuring that any data logged as accessed via the virtual machine is known to have been accessed by the identified user.

In a more detailed example, consider the hospital records environment discussed previously. Although it is desirable for all medical care providers to have ready access to patient data to ensure timely medical care can be provided, undesired access to medical records is an ongoing problem and tracking access is desirable. In this situation, a nurse can log in to a computer system and request medical records such as treatment history, x-rays, or other data related to a celebrity, and the request will be forwarded to a data system storing the requested information. In this example, one or more virtual machines are started to provide the requested data and services to the nurse, and the virtual machines are associated specifically with the nurse. Although the virtual machines do not require the nurse to separately log in to each data system to retrieve the requested information, the virtual machines are associated only with the nurse, such that any data accessed via the virtual machines can be identified as accessed by the nurse.

Similarly, virtual machines for projects or other user identifiers can be used to provide information in other environments, such as using different virtual machines for accounting, purchasing, shipping, production, and other projects or groups in the previous beverage production example. Different virtual machines for both projects and users may be created in some examples, enabling tracking both at the user level and at the project or group level where users are not uniquely assigned to single projects.

Each created virtual machine is tagged or identified with a user identifier, and user access data logs indicating what data was accessed are created within the virtual machine. These logs can be maintained and queried within the virtual machine, can be maintained in a server or other central location, or can be provided to a data access log for later analysis. In another example, data logs are regularly gathered from virtual machines within a system to ensure that a central record of data access is up-to-date.

Some services are desirably shared among multiple users, such as an Enterprise Resource Planning (ERP) system that manages scheduling of resources across the beverage manufacturer's facilities in the earlier example. Although the beverage manufacturer may simply elect to maintain a separate ERP system to provide such functionality, it may be desirable to have some services dedicated to the individual user interact directly with services that must be shared. In such an example, ERP scheduling requests or other interaction between the virtual machine and the shared resource such as an ERP system can be logged as they are emitted from the virtual machine. Although the user's identity may well have been lost in the many layers of legacy software before a request to a shared ERP resource is made, identity information can be reattached as data is emitted from a virtual machine dedicated to a particular user.

Reattaching the user identity can be as simple as directing logs for external requests from the virtual machine into a log file that includes the user's identity. The number and type of requests from a single user can similarly be regulated using user-specific virtual machines where it might otherwise be impossible, such as by sending requests from user-specific virtual machines through a proxy that is aware of the virtual machine's associated user and rights. For example, a certain user may be permitted to allocate up to 30% of manufacturing resources, but limited to resources in a specific facility. Requests that exceed this limit can be identified and flagged, or blocked by the proxy. Similarly, a user who requests very large volumes of data or resources can also be identified, enabling early detection of a potentially rogue user not acting within the scope of the user's responsibilities.

In the financial services industry, for example, rogue traders often allocate more money than they are allowed to handle, resulting in an increased potential for loss or theft. Use of a standard protocol such as SOAP (Simple Object Access Protocol) makes the proxy's task of monitoring and understanding proxy requests straightforward, so that trading requests and other actions taken by a trader can be monitored and logged using virtual machines assigned specifically to the trader or group. Policies such as trading frequency, investment classes for a particular trader, limits on allocation of money, and other such restrictions can be implemented via the proxy in legacy systems where no knowledge of the trader's identity would have been known without use of a trader-specific virtual machine.

Figure 1:
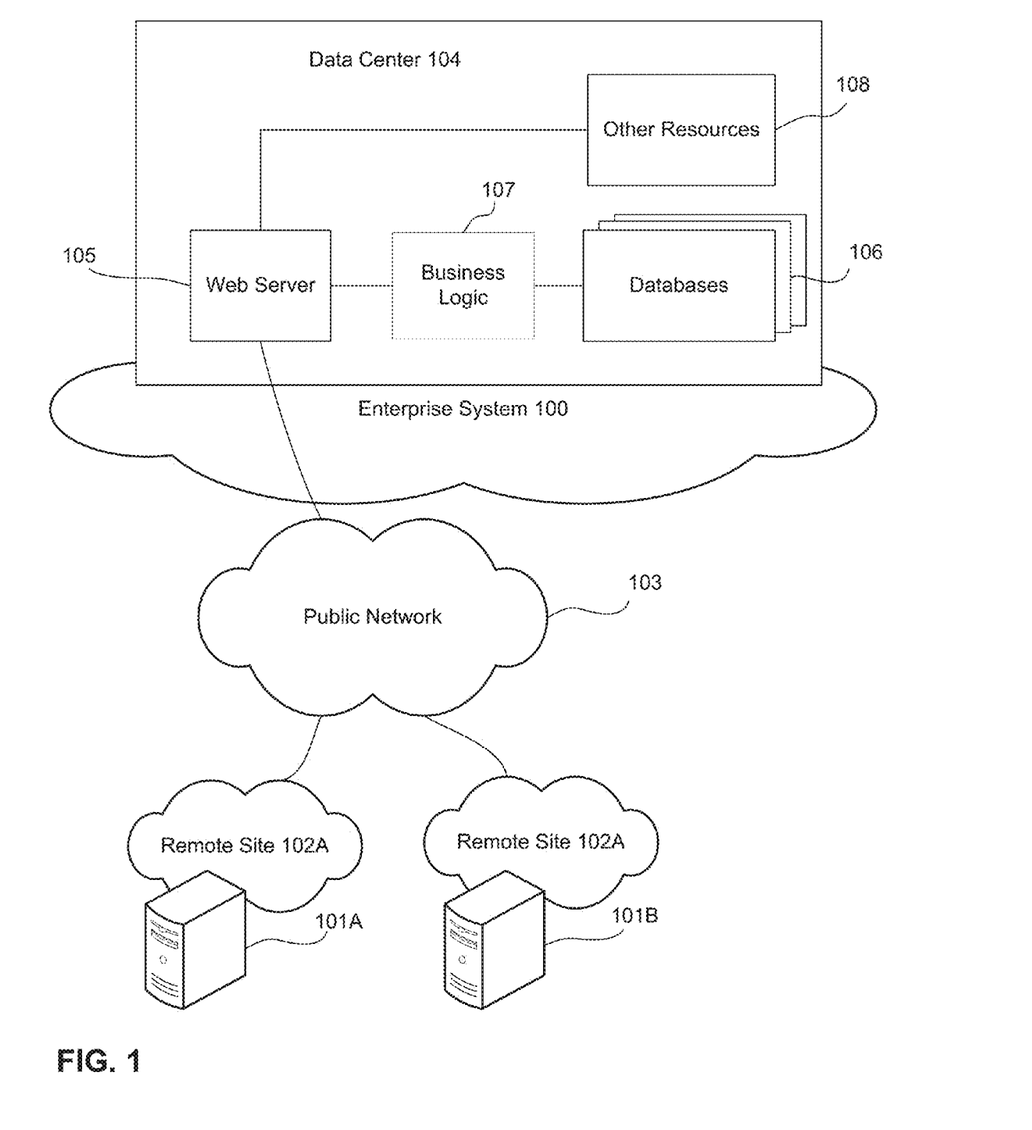
FIG. 1 is a block diagram illustrating an example enterprise system including a data center having multiple systems providing multiple services to one or more users via a gateway device, consistent with an example embodiment of the invention.

FIG. 1 is a block diagram illustrating an example enterprise system 100 including a data center 104 having multiple systems providing multiple services to one or more users 101A-101B ("users 101"). Here, users 101 located at remote sites 102 log into enterprise system 100 to access data center 104 via a public network 103, such as the Internet. In other examples, a user may be local to data center 104 of enterprise system 100, such as a business user within a corporation's private network accessing an internal server.

Enterprise system 100 in a further example provides access to sensitive data and services that are accessible only to certain authorized users of the enterprise, e.g., users 101. Users 101 may access enterprise system 100 by authentication to a web server 105 and establishing a communication channel through public network 103. In this way, enterprise administrators may use the web server portal 105 to discriminate access to enterprise system 100 by individual employees based on employee authorization. In this way, enterprise system 100 enables remote access to data center 104.

Data center 104 may include, for instance, a web server 105, one or more databases 106, and business logic 107 used to facilitate information requests between web server 105 and databases 106. For example, business logic 107 may comprise an application server, a database server, a file server, an application, an employee workstation, a native messaging or email client, or other electronic resource.

Users 101 of remote sites 102 may comprise remote employees or customers of enterprise system 100 that may be authorized to access data center 104 of enterprise system 100. In the illustrated example, users 101 may comprise user computing devices, such as personal computers, laptop computers or other type of computing device associated with individual employees or other authorized users.

Users 101 connect to web server 105 of enterprise system 100. Once the users authenticated web server 105, users 101 may access data center 104 via a user interface provided by web server 105. Users 101 then use the web interface to formulate requests for other data or services, such as to conduct a banking transaction, check or update medical records, or check inventory and schedule manufacturing. Business logic 107 within data center 104 enables inputs received from the user via the web server 105 to be formulated as queries to other resources, such as databases 106.

Although the user logging into web server 105 has authenticated his identity to the data center 104, such as by using a username and password, the web server is the only system in the data center to which the user has been authenticated. When the business logic 107 formulates a database query in response to user actions, the database query is sent to databases 106 as a single anonymous "system user", irrespective of what user has caused the web server 105 and business logic 107 to make such a request. The web server 105 in many instances interacts with other systems such as the business logic 107 and database systems 106 described above to provide information. The databases 106 simply provide information to the trusted web server 105 with little or no authentication or tracking provided to the databases 106 themselves. Although databases 106 are typically protected from receiving queries from sources that aren't trusted, such as from systems other than trusted and authenticated systems within data center 104, the lack of database authentication or identification of the requesting user making such database requests makes tracking or auditing access to data difficult.

According to the techniques described herein, identity of the users 101 is maintained in conducting queries of databases 106, or in accessing other resources 108, by operating a virtual machine used only by the user to facilitate such access. Logged actions made via the virtual machine can therefore be associated with the user, where the user is not otherwise directly identified to the virtual machine, enabling tracking or auditing access to databases 106 or other resources.

In a more specific example, the web server 105 receives login credentials from a user 101 via the public network 102, and receives a request for a network resource such as databases 106 from the user 101. One or more virtual machines are instantiated if they do not exist, or are utilized if already running, and are associated with the identified user and used only by the identified user. In some examples the virtual machines are initiated or managed by business logic 107, web server 105, or a database server at databases 106, but will be initiated or managed by other systems in other examples.

The request for the network resource is processed in the one or more virtual machines associated with the identified user 101, such that the request does not include the identity of the user 101. A record of the request for network resources is stored in a log associated with the identified user 101 comprising requests processed by the one or more virtual machines used only by the identified user 101. Because the virtual machine is unique to the user 101, the log of requests made to the one or more virtual machines is associated with the user 101 based on the one or more virtual machines being used only by the identified user 101.

Figure 2:
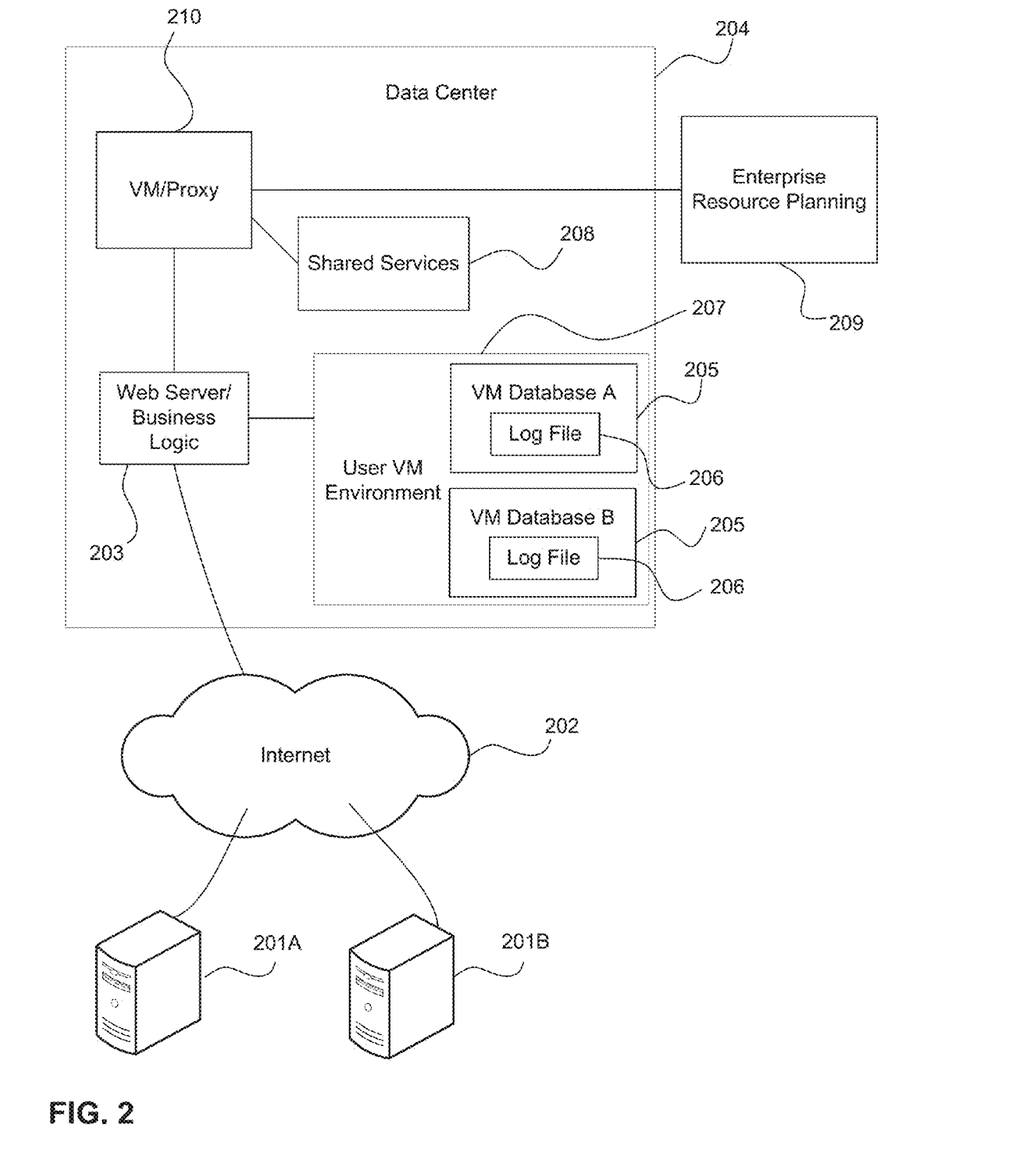
FIG. 2 is a block diagram illustrating an enterprise system with a gateway device capable of generating user-specific virtual machine environments for each user of the enterprise system to maintain user identity when accessing the data center, consistent with an example embodiment of the invention.

FIG. 2 is a block diagram illustrating use of a user-specific virtual machine to maintain user identity, consistent with an example embodiment of the invention. Here, a user 201 uses a network connection such as the Internet 202, a local area network, a wireless network, or other network to contact a web server 203 comprising part of a service provider's system such as is shown in data center 204. The user is authenticated to the web server 203 such as by providing a username and password, and uses the server to access various resources or services within the web server's network. In other examples, a user constitutes something other than a single person, such as a group or location.

Once the user has logged on to the web server in this example, the user uses the provided web interface to access data within a database, access a shared external Enterprise Resource Planning (ERP) system, or access other resources within the network. But, when the web server and business logic 203 formulate a query to a database, the data is typically retrieved from the database by the web server or business logic identifying itself as a generic system user of the database, and the identity of the logged in user is not evident to the database or otherwise logged.

Rewriting business logic, database code, middleware, or other legacy system code that is a part of the data request process to track user identity may be impossible with purchased or old legacy code, or very expensive with large or complex systems.

Some embodiments of the invention therefore provide resources such as database data to a user by starting a virtual machine for each different user, such as virtual machine databases 205. These virtual machines execute in a user virtual machine environment provide data in response to data requests from the web server 203, each serving a single user 201. Information used to identify or track the requested data can therefore be stored in a log file 206 associated with each virtual machine, such as on the virtual machine or another computerized system, and associated with the only user of the virtual machine. This enables user-by-user tracking and auditing of resource usage, such as database access, resolving data access tracking problems such as those discussed above.

A virtual machine is in various examples a particular instance of an operating system, program, or other service provided by a computer system, operating separately from other software that may be running on the same computer. Virtual machines come in various forms, including system virtual machines that are able to run a complete operating system and application software, and process virtual machines that are operable to run a single program or process isolated from other applications that may be running on the same computer system.

Different users may use different virtual machines on the same computer system, such that each virtual machine appears to be a different machine than the other virtual machines operating on the same computer system. This enables users to share computing resources such that it appears to different users that they have their own dedicated systems, without requiring a separate computer system for each user or group.

Virtual machines often use virtualized representations of hardware, such as storage, networking, and other resources that an application running in a virtual machine may need. This hardware virtualization is typically managed by a hypervisor, which is a virtual machine manager that manages allocation of time, storage, and other system resources allocated to one or more virtual machines running on the computer system. The hypervisor typically runs either directly on the host computer system, or in an operating system which is then used to manage virtual machines that run within the operating system.

In the example of FIG. 2, when the web server sends a resource request such as a database query to other systems that do not have knowledge of the user 201, a virtual machine 205 is started to serve each user. The processes implemented by the virtual machine to provide the user services or data are not changed, but code is written to start a new virtual machine for the user if a virtual machine associated with the user does not already exist, and to associate the user's identity with the virtual machine. The virtual machine (VM) database applications 205 are therefore used to serve only the respective users 201 uniquely associated with a virtual machine application, and a log file 206 used to track queries made in the virtual machine's database application contains only queries conducted by the respective user 201. The log file 206 can therefore be associated with the user 201, and stored or otherwise used to monitor, audit, or permit/deny database access based on the user's identity. The virtual machine 205 can be used to provide multiple requests for data to the same user, or multiple virtual machines can be created for a single user who demands large amounts of resources or resources of different types.

This system of virtual machines for each user works well where the virtual machine can be created to provide a service that serves a single person. In other instances, shared resources such as shared services 208 in data center 204, or external Enterprise Resource Planning (ERP) system 209 include resources that must be shared with other users, such as to reserve machine time in a manufacturing plant, a user-specific virtual machine 210 is used to interact with the shared resource. This enables the user-specific virtual machine 210 to record or log any interactions with the shared resources such as shared services 208 or ERP system 209, knowing that the recorded data is all associated with associated user 201. This further enables services such as database 205 to interact with the shared resources, such as to account for and create an invoice for resources consumed or goods produced.

The virtual machine 210 in a further example includes a proxy, or is coupled to shared resources via a proxy that is operable to monitor requests coming from a single virtual machine 210. The proxy can be used to make sure that resource use does not exceed limits set by policy, such as to detect rogue traders in the financial services industry. The proxy may not have knowledge of the individual trader's identity, or may know the identity based on the identity of the user-specific virtual machine making the request.

In a more detailed example, different virtual machine configurations may be started depending on the requesting user. In a financial services firm, traders may be given access to a set of five resources that provide information needed to conduct trading operations, but do not have access to data or applications related to management of the financial services firm such as salary or other compensation data. Similarly, members of management and human resources groups may be given access to salary and compensation data, payroll systems, and firm account data not available to traders, but may be restricted from conducting trading operations. These resources may be configured to be accessed through a single virtual machine created for the user, or may be different virtual machines that provide different data or services.

Virtual machines such as VM Databases 205 and VM/Proxy 210 used to access shared resources may be either eliminated or archived to maintain the user's preferences, permissions, and other such data relating to the virtual machine. When the same user logs back in, archived virtual machine data can be used to re-instantiate the virtual machine, including the user's specified preferences and permissions or other such data.

Figure 3:
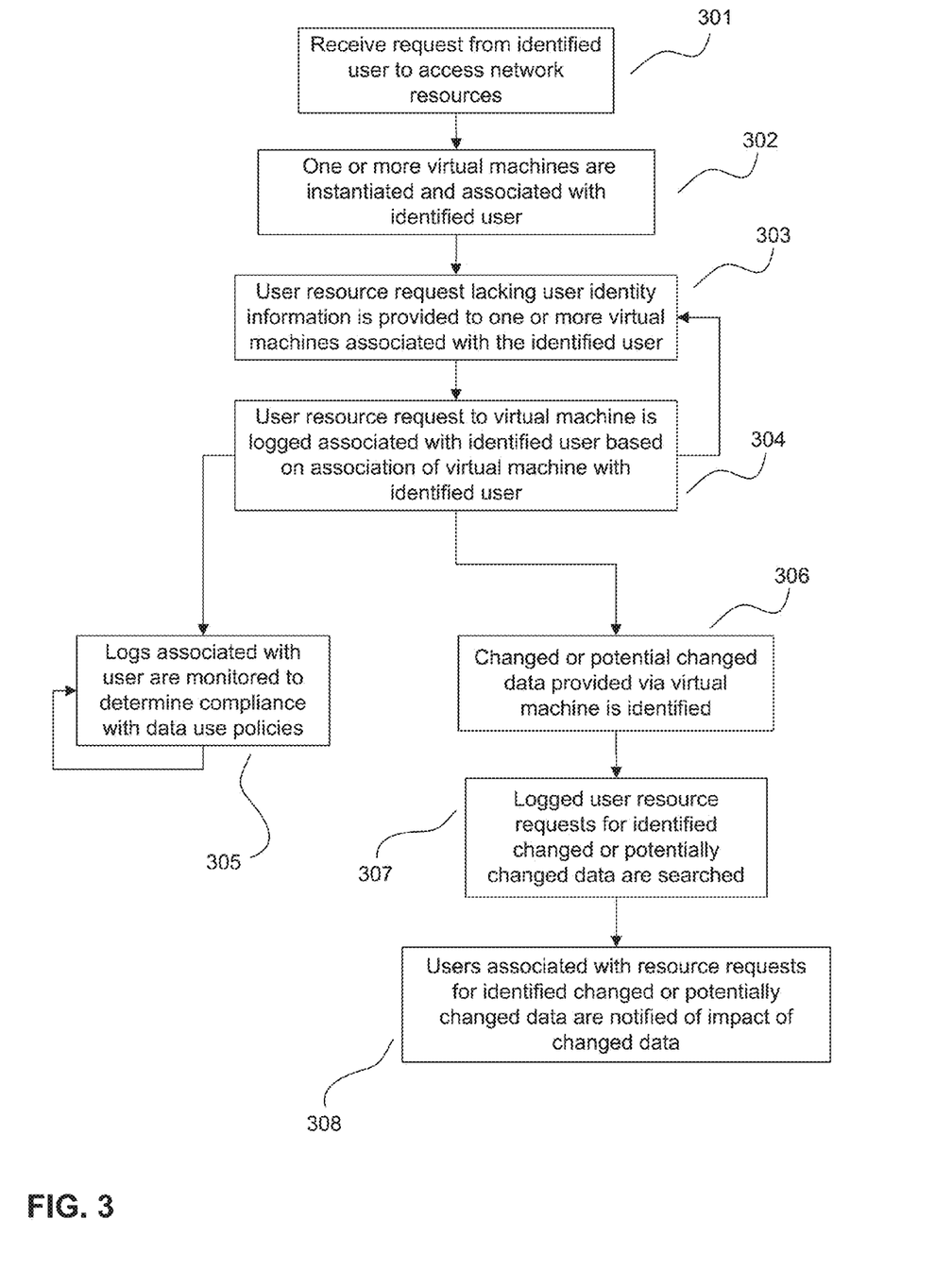
FIG. 3 is a flowchart of a method of preserving user identity using a virtual machine, consistent with an example embodiment of the invention.

FIG. 3 is a flowchart of a method of preserving user identity using a virtual machine, consistent with an example embodiment of the invention. Here, an identified user requests access to network resources at 301. The user may be identified by providing a login and password, or thorough any other suitable means. Access to network resources is requested such as by logging into a system such as a web interface, remote server, or other computer system. Once the user is logged in or identified to the first computer system, the user requests access to network resources, such as by executing an application to query a database, submitting a web page that forms a query for data using business logic, or through another request mechanism.

Although the user has been identified to the first system, the first system formulates data or other resource requests for other systems that are conveyed without user identity information, such as to legacy information systems or third-party systems that do not support identity management. One or more virtual machines are therefore instantiated and associated with the user at 302, such as by starting the virtual machine with a log file identifying the user, associating the virtual machine with a user in a virtual machine management system, or otherwise associating the identified user with the one or more virtual machines.

Multiple virtual machines are created in some examples to provide access to different resources or data, such as creating one virtual machine to provide access to an inventory system, another virtual machine to provide access to an accounting system, a third virtual machine to provide access to a Geographic Information System (GIS), etc. In other examples, a single virtual machine associated with the identified user may include applications or other interfaces that provide access to a variety of resources such as these.

Once the one or more virtual machines associated with the user are instantiated at 302, the identified user's request for a resource such as a database query are provided to the one or more virtual machines at 303, but without conveying identity information of the user to the virtual machine. This may be because the virtual machine resource or service does not support identity tracking, or does not support identity tracking in the same way as the first system making the request. The first system in a more detailed example is simply identified to the virtual machine as a generic "system user", and retrieves the requested resource or data from the virtual machine.

The virtual machine logs the request at 304, and although applications or services running within the virtual machine may not be aware of the user's identity, the virtual machine is associated with only one user (or other identifier, such as a group of users, location, etc.). The log information created by the virtual machine can therefore be associated with the identified user associated with the virtual machine, such as by a management system correlating the name of the virtual machine with a record of the associated identified user, by naming or tagging a log file provided by the virtual machine with the identified user's identity, or through another mechanism.

This process shown at 303-304 may repeat, with multiple requests for data or other resources from the one or more virtual machines resulting in logging the requests in log files associated with the virtual machines, which can then be matched with the identified users associated with the virtual machines to track or audit network resource or data access on a user-by-user basis.

In one such example, the created logs from the one or more virtual machines are associated with the identified user as shown at 304, and are monitored to determine whether the user is complying with data or resource use policies at 305. For example, a trader may be able to allocate up to a certain dollar amount of resources, after which point the monitoring process at 305 will alert a supervisor that trading limits have been exceeded. Similarly, the number of documents, messages, or other data requested per period of time may be monitored the monitoring process at 305, such that a rogue user's attempt to copy large volumes of data from the network resources can be detected automatically.

Association of the identified user with data or resource access logs can also be used to identify which individual users, groups of users, projects, or other identified system users have used which data. For example, if the cost of sugar goes up dramatically, a beverage manufacturer may wish to update any analytics that include the cost of sugar in their decisions or forecasts. Similarly, management may wish to predict how the price of sugar will impact the company, involving input from any analyst who uses the price of sugar in their forecasting. To do this, the changed or potential changed data such as the cost of sugar is identified at 306, and log files for identified users such as analysts or projects that have accessed the price of sugar data are searched in the virtual machine logs associated with the identified users at 307.

These identified users who are determined to have accessed the changed or potentially changed data at 307 can then be notified at 308, such as by manually or automatically notifying the people, groups, projects, or other users impacted by the data change. Returning to our cost of sugar example, forecasts and analysis that are impacted by the price of sugar can therefore be identified and reevaluated, while other projects or users that perform work that is not impacted by a changed cost of sugar do not need to be notified or perform updated analysis.

Because the processing power needed to create one or more virtual machines for an identified user and to associate the logged data or resource requests in the virtual machine with the identified user are typically a small fraction of the computing resources needed to handle the user's requests, the impact on creating user-specific virtual machines to preserve identity in computer systems is low. The virtual machines created may in various examples be any type of virtual machine, running across one or more computer systems to perform functions such as are described in the examples presented here.

Figure 4:
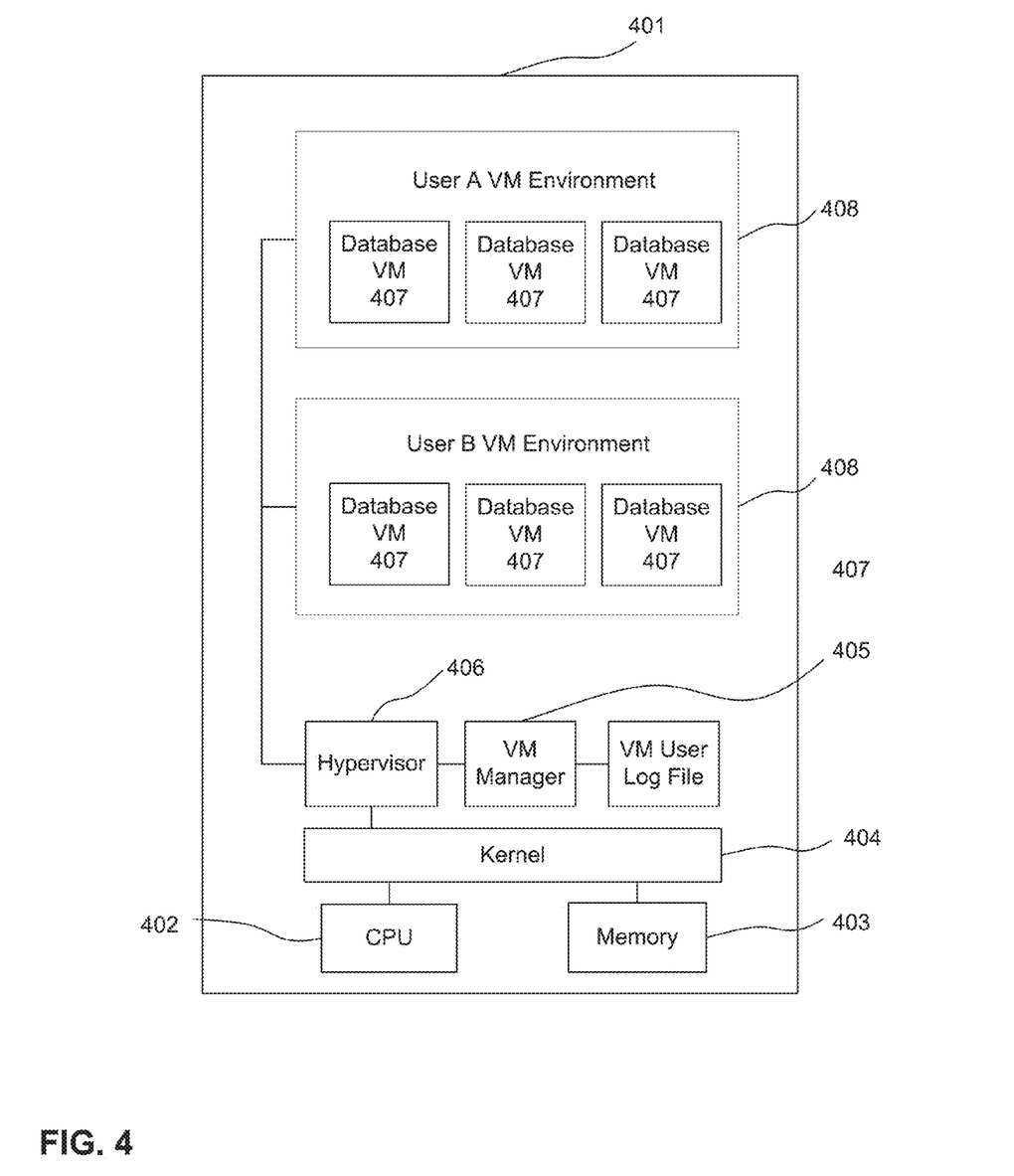
FIG. 4 is a block diagram illustrating a gateway device operable to manage user-specific virtual machine environments, consistent with an example embodiment of the invention.

An example computer system hosting virtual machines such as may be used to practice some embodiments of the invention is shown in FIG. 4. In one example, the computerized system 401 corresponds to user VM environment 207 of FIG. 2.

Here, the computer system 401 includes a central processing unit (CPU) or processor 402, and memory 403. The processor executes a kernel 404, which in some embodiments comprises an operating system such as Microsoft Windows®, while in other embodiments is part of a scaled-down version of a commercially available operating system such as a Linux kernel, or is a custom operating system kernel written to enable the hypervisor to run directly on the computer system hardware.

Virtual machine manager 405 and hypervisor 406 work together to present a virtual operating platform to virtual machines 407 in user virtual machine environments 408 for example users A and B, and to manage execution of the guest operating systems running in the virtual machines. In systems where the kernel 404 is custom written to support they hypervisor and virtual machine manager, the hypervisor is often referred to as a native hypervisor. In examples where the VM manager 405 and hypervisor 406 run on another operating system, such as Windows Server®, the hypervisor is referred to as a hosted hypervisor. The hypervisor is also a commercially available product, such as VMWare® or Microsoft Virtual Machine.

Although the virtual machines are often hosted on servers, such as are found in large data centers, the user computer system, virtual machines, web servers, business logic, proxies, shared services, and other computing resources in the various examples presented here can be implemented in a variety of computerized systems.

Figure 5:
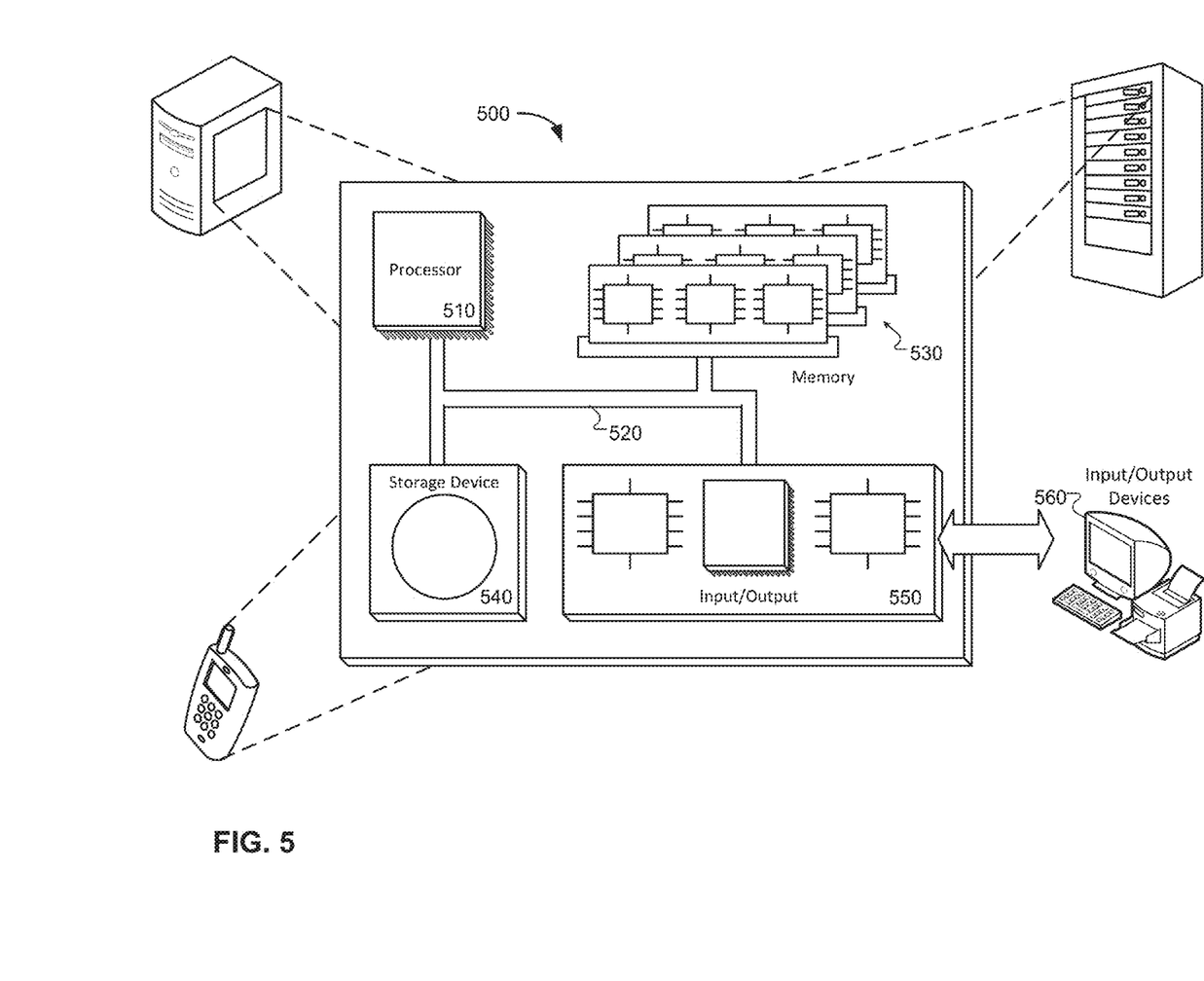
FIG. 5 is a block diagram of a computerized system, as may be used to practice various embodiments of the invention.

A more detailed example of such a computer is shown in FIG. 5, as may be used to practice some embodiments of the invention. Here, a computer 500 includes a processor 510 that is operable to execute program instructions or software, causing the computer to perform various methods or tasks. In various examples, computer system 500 is used to provide a user virtual machine environment as in FIG. 4, business logic such as 107, or other functions as described herein.

Here, the processor is coupled via bus 520 to a memory 530, which is used to store information such as program instructions and other data while the computer is in operation. A storage device 540, such as a hard disk drive, nonvolatile memory, or other non-transient storage device stores information such as program instructions, data files, and other information both during operation and when the computer is turned off or not in use. The computer also includes various input-output elements 550, including parallel or serial ports, USB, Firewire or IEEE 1394, Ethernet, and other such ports to connect the computer to external device such a printer 560. Other input-output elements include wireless communication interfaces such as Bluetooth, Wi-Fi, and cellular data networks.

The computer itself may be a traditional personal computer, a smart phone, a rack-mount or business computer or server as shown in FIG. 5, or any other type of computerized system. Other examples include appliances such as a set-top box, including a separate appliance or incorporated into another appliance such as a media player or television. The computer in a further example may include fewer than all elements listed above, such as a thin client or mobile device having only some of the shown elements. In another example, the computer is distributed among multiple computer systems, such as a distributed server that has many computers working together to provide various functions.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer readable data storage medium comprising instructions that, when executed, cause one or more processors to perform one or more of the methods described above. For example, the computer-readable data storage medium may store such instructions for execution by a processor. Any combination of one or more computer-readable medium(s) may be utilized.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In general, a computer-readable storage medium may be any tangible medium that can contain or store a program for use by or in connection with an instruction execution system, apparatus, or device. Additional examples of computer readable medium include computer-readable storage devices, computer-readable memory, and tangible computer-readable medium. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other processing circuitry suitable for implementation of the techniques described herein. In addition, in some aspects, functionality described in this disclosure may be provided within software modules or hardware modules.

The example embodiments presented here illustrate how user-specific virtual machines can be used to preserve identity in a computer system. Although specific embodiments have been illustrated and described herein, it will be appreciated by those of ordinary skill in the art that any arrangement that achieve the same purpose, structure, or function may be substituted for the specific embodiments shown. This application is intended to cover any adaptations or variations of the embodiments of the invention described herein. It is intended that this invention be limited only by the claims, and the full scope of equivalents thereof.

The invention claimed is:

1. A method, comprising:
receiving, by a server in a computer system from a user of the computer system, a request for access to a network resource in a legacy system, wherein the request includes a user identifier value that identifies the user, and wherein the legacy system is incapable of tracking the user identifier value;
upon receiving the request for access to the network resource in the legacy system from the user, determining, by the server of the computer system, whether at least one of a plurality of virtual machines that are uniquely associated with the user identifier value is running in a virtual machine environment of the computer system;
based on the at least one of the plurality of virtual machines not running in the virtual machine environment, instantiating, by the server of the computer system and in the virtual machine environment of the computer system, one or more virtual machines that are uniquely associated with the user identifier value and that are used only by the user, wherein the one or more virtual machines are configured to provide the user with access to the network resource in the legacy system;
processing, by the one or more virtual machines in the virtual machine environment of the computer system, the request for access to the network resource in the legacy system, wherein processing the request for access comprises performing one or more data requests to the network resource in the legacy system for the user without including the user identifier value in the one or more data requests;
storing, by the one or more virtual machines in the virtual machine environment of the computer system, a record of the one or more data requests to the network resource in the legacy system performed by the one or more virtual machines in a log file associated with the one or more virtual machines, wherein the log file stores the user identifier value that identifies the only user of the one or more virtual machines; and
identifying, by the server in the computer system and to an administrator of the computer system, the user associated with the one or more data requests to the network resource in the legacy system based on the user identifier value stored in the log file associated with the one or more virtual machines.

2. The method of claim 1, wherein processing the request for access to the network resource comprises querying a database in the legacy system.

3. The method of claim 1, further comprising monitoring the stored record of the one or more data requests to the network resource in the log associated with the one or more virtual machines to determine compliance by the user with a resource use policy.

4. The method of claim 1, wherein the request for access to the network resource comprises a request for a shared resource in the legacy system, and wherein at least one of the one or more virtual machines comprises a shared resource virtual machine, wherein processing the request for access to the network resource comprises performing, by the shared resource virtual machine, additional data requests to the shared resource in the legacy system for the user without including the user identifier value in the additional data requests, and wherein storing the record of the one or more data requests to the network resource further comprises storing a record of the additional data requests to the shared resource in the legacy system performed by the shared resource virtual machine.

5. The method of claim 1, further comprising:
identifying a first data element comprising already-changed data or potentially changed data;
searching one or more logs of stored records of data requests to network resources in the legacy system for data requests to the first data element; and
identifying one or more users associated with the data requests to the first data element based on the logs.

6. The method of claim 5, further comprising notifying the one or more users associated with the data requests to the first data element of the already-changed data or the potentially changed data.

7. The method of claim 1, wherein the user of the computer system comprises a single person, a group that includes one or more people, a project to which one or more people are assigned, or a location in which one or more people are located.

8. A computerized system, comprising:
a server in a computer system comprising a processor and memory, the server configured to receive from a user of the computer system a request for access to a network resource in a legacy system, wherein the request includes a user identifier value that identifies the user, and wherein the legacy system is incapable of tracking the user identifier value, upon receiving the request for access to the network resource in the legacy system from the user, determine whether at least one of a plurality of virtual machines that are uniquely associated with the user identifier value is running in a virtual machine environment of the computer system, and based on the at least one of the plurality of virtual machines not running in the virtual machine environment, instantiate one or more virtual machines in the virtual machine environment of the computer system that are uniquely associated with the user identifier value and that are used only by the user; and the one or more virtual machines in the virtual machine environment of the computer system configured to process the request for access to the network resource in the legacy system, wherein the one or more virtual machines are configured to perform one or more data requests to the network resource in the legacy system for the user without including the user identifier value in the one or more data requests, and store a record of the one or more data requests to the network resource in the legacy system performed by the one or more virtual machines in a log file associated with the one or more virtual machines, wherein the log file stores the user identifier value that identifies the only user of the one or more virtual machines, the server in the computer system further configured to identify, to an administrator of the computer system, the user associated with the one or more data requests to the network resource in the legacy system based on the user identifier value stored in the log file associated with the one or more virtual machines.

9. The computerized system of claim 8, wherein, to process the request for access to the network resource, the one or more virtual machines are further configured to query a database in the legacy system.

10. The computerized system of claim 8, the computer system further configured to monitor the stored record of the one or more data requests to the network resource in the log associated with the one or more virtual machines to determine compliance by the user with a resource use policy.

11. The computerized system of claim 8, wherein the request for access to the network resource comprises a request for a shared resource in the legacy system, and wherein at least one of the one or more virtual machines comprises a shared resource virtual machine, wherein, to process the request for access to the network resource, the shared resource virtual machine performs additional data requests to the shared resource in the legacy system for the user without including the user identifier value in the additional data requests, and wherein, to store the record of the one or more data requests to the network resource, the computer system stores a record of the additional data requests to the shared resource in the legacy system performed by the shared resource virtual machine.

12. The computerized system of claim 8, the computer system further configured to identify a first data element comprising already-changed data or potentially changed data, search one or more logs of stored records of data requests to network resources in the legacy system for data requests to the first data element, and identify one or more users associated with the data requests to for the first data element based on the logs.

13. The computerized system of claim 12, the computer system further configured to notify the one or more users associated with the data requests to the first data element of the already changed data or the potentially changed data.

14. The computerized system of claim 8, wherein the user of the computer system comprises a single person, a group that includes one or more people, a project to which one or more people are assigned, or a location where one or more people are located.

15. A non-transitory machine-readable medium with instruction stored thereon, the instructions when executed cause a computerized system to:

receive, by a server in a computer system from a user of the computer system, a request for access to a network resource in a legacy system, wherein the request includes a user identifier value that identifies the user, and wherein the legacy system is incapable of tracking the user identifier value;

upon receiving the request for access to the network resource in the legacy system from the user, determine, by the server of the computer system, whether at least one of a plurality of virtual machines that are uniquely associated with the user identifier value is running in a virtual machine environment of the computer system;

based on the at least one of the plurality of virtual machines not running in the virtual machine environment, instantiate, by the server in the computer system and in the virtual machine environment of the computer system, one or more virtual machines that are uniquely associated with the user identifier value and that are used only by the user, wherein the one or more virtual machines are configured to provide the user with access to the network resource in the legacy system;

process, by the one or more virtual machines in the virtual machine environment of the computer system, the request for access to the network resource in the legacy system, wherein the instructions cause the computerized system to perform one or more data requests to the network resource in the legacy system for the user without including the user identifier value in the one or more data requests;

store, by the one or more virtual machines in the virtual machine environment of the computer system, a record of the one or more data requests to the network resource in the legacy system performed by the one or more virtual machines in a log file associated with the one or more virtual machines, wherein the log file stores the user identifier value that identifies the only user of the one or more virtual machines; and identify, by the server in the computer system and to an administrator of the computer system, the user associated with the one or more data requests to the network resource in the legacy system based on the user identifier value stored in the log file associated with the one or more virtual machines.

16. The machine-readable medium of claim 15, wherein the instructions to process the request for access to the network resource further cause the computerized system to querying a database in the legacy system.

17. The machine-readable medium of claim 15, the instructions when executed further cause the computerized system to monitor the stored record of the one or more data requests to the network resource in the log associated with the one or more virtual machines to determine compliance by the user with a resource use policy.

18. The machine-readable medium of claim 15, wherein the request for access to the network resource comprises a request for a shared resource in the legacy system, and wherein at least one of the one or more virtual machines comprises a shared resource virtual machine, wherein the instructions to process the request for access to the network resource further cause the computerized system to perform, by the shared resource virtual machine, additional data requests to the shared resource in the legacy system for the user without including the user identifier value in the additional data requests, and wherein the instructions to store the record of the one or more data requests to the network resource further cause the computerized system to store a record of the additional data requests to the shared resource in the legacy system performed by the shared resource virtual machine.

19. The machine-readable medium of claim 15, the instructions when executed further cause the computerized system to identify a first data element comprising already changed data or potentially changed data, search one or more logs of stored records of data requests to network resources in the legacy system for data requests to the first data element, and identify one or more users associated with the data requests to the first data element based on the logs.

20. The machine-readable medium of claim 19, the instructions when executed further cause the computerized system to notify the one or more users associated with the data requests to the first data element of the already-changed data or the potentially changed data.

* * * * *